(No Model.)
A. E. KENNELLY.
ELECTRICAL METER.
No. 479,167. Patented July 19, 1892.
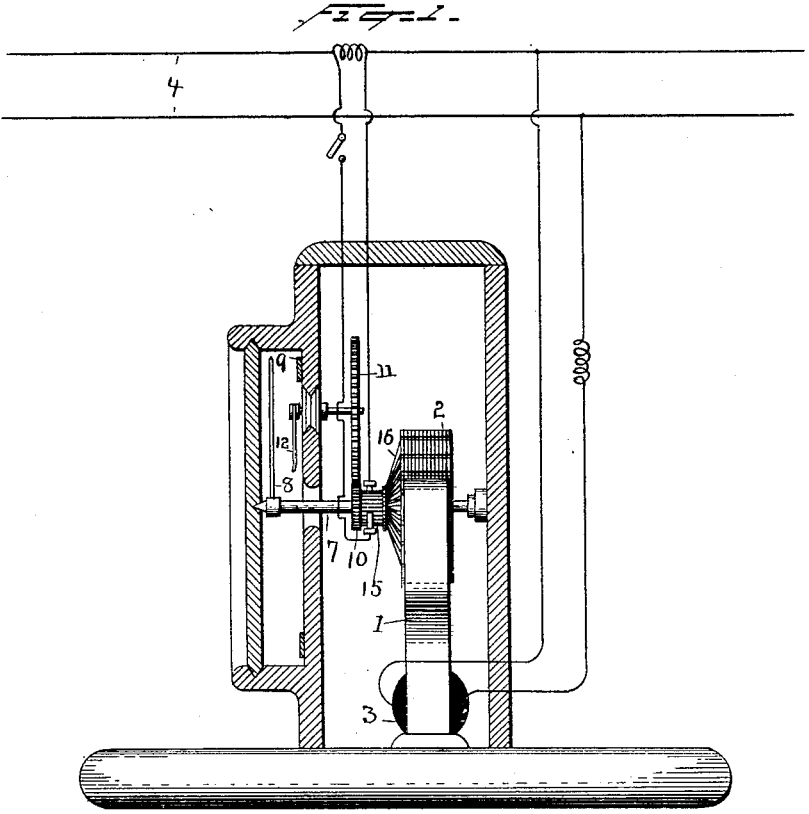
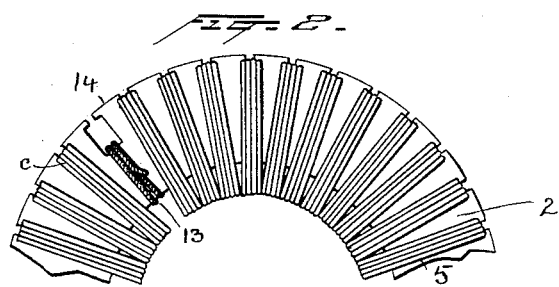
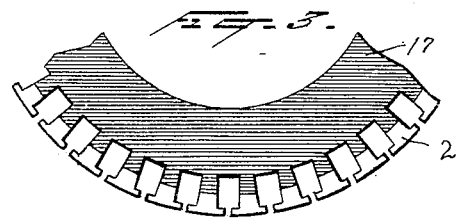
Witnesses
Norris A. Clark
N. F. Oberly
Inventor
A. E. Kennelly
By his Attorneys
Dyer & Seely

UNITED STATES PATENT OFFICE.

ARTHUR E. KENNELLY, OF ORANGE, NEW JERSEY, ASSIGNOR TO THE EDISON GENERAL ELECTRIC COMPANY, OF NEW YORK, N. Y.

ELECTRICAL METER.

SPECIFICATION forming part of Letters Patent No. 479,167, dated July 19, 1892.

Application filed October 17, 1891. Serial No. 409,009. (No model.)

*To all whom it may concern:*

Be it known that I, ARTHUR E. KENNELLY, a subject of the Queen of Great Britain, residing at Orange, in the county of Essex and State of New Jersey, have invented a certain new and useful Improvement in Electrical Meters, of which the following is a specification.

The present invention relates to means for giving a definite load to electrical motors, especially motors employed for advancing the recording mechanism of meters.

The invention consists in the combination, with a meter mechanism, of an electrical motor the armature of which has one or more coils forming a closed circuit or closed circuits, and a second winding forming the ordinary armature-coils; and the invention consists, also, in certain other combinations, as hereinafter set forth.

It has been proposed heretofore—for example in patent to Edison, No. 242,901, dated June 14, 1881—to drive a meter mechanism by an electrical motor connected to the supply-circuit, and having a definite amount of work to perform, the work in that case being the moving of a fan in the air or in a liquid dash-pot. The resistance to motion which a fan will offer depends upon its form and upon its position in the apparatus, and this has to be adjusted in order to obtain the correct proportion between speed and the current measured, whereas the resistance due to currents in closed coils or conductors on the armature is perfectly definite for any given motor and field excitation.

The fans and dash-pots shown in the patent referred to occupy considerable space and require several additional parts in the apparatus which complicate the mechanism to some extent, and by the present invention these objections are obviated.

It has also been proposed to retard the motion of an electrical motor by mounting a non-magnetic metallic disk on the shaft and causing said disk to move in a magnetic field, currents being set up in said disk which oppose motion of the armature; but this arrangement requires a special construction of the field and is otherwise objectionable.

In the accompanying drawings, Figure 1 is a side view, partly in section, of one form of meter with the improved motor for driving it. Fig. 2 is a side view of a part of an armature embodying the improvement, an armature-coil being removed at one point to show a detail of construction; and Fig. 3 is a view of a part of an armature having a closed conductor of different form.

1 is the field-magnet of the motor, and 2 the revolving armature thereof. The field-magnet coil 3 is shown connected across between the line-wires 4 of an ordinary continuous-current circuit similarly to the lamps or translating devices of the system. This particular mode of connecting the motor to the circuit is not essential, although it is considered the best. The motor-shaft 7 is extended and carries a pointer 8, which passes over a register face or dial 9, which in practice corresponds to the first wheel of the register employed in a gas-meter. On the same shaft is a pinion 10, which gears with the wheel 11, the shaft of which carries an index-finger 12, the pinion 10 and wheel 11 being so proportioned that finger 12 shall advance one step at each complete revolution of pointer 8.

In constructing the armature of the motor I provide a suitable core, preferably a ring, of the form shown in Fig. 2, and fully described in the application of myself and John F. Ott, Serial No. 409,380, filed October 21, 1891, and wind thereon one or more low-resistance insulated conductors 13, said conductor or conductors having their ends connected so as to form a closed coil, or closed coils, on the core. Over these idle coils, and in the spaces between the T-shaped extensions 14, are wound the ordinary armature-coils C, which are connected in series and are connected to the commutator 15 by wires 16. It is not essential that the closed coils be placed under the main coils, since the operation would be the same if they were placed over or beside the main coils. The closed conductor may be formed of a copper or other electro plating directly on the core. Such a plating is indicated at 17, Fig. 3, and covers the whole core except the outer portions of the T extensions. When current is sent through the motor, and its armature moves, current will be generated in the closed coil or coils 13, which creates a torque opposing the forward movement of the armature, which, in other words, constitutes work which the motor has to overcome. This work will be exactly proportional to the speed of rotation of the motor, and the speed of the motor will depend on the current being consumed. Thus the armature, which is simple in construction, and which is complete in itself automatically gives the definite load required in a cheap and reliable manner.

I do not claim, broadly, a motor the armature of which has a coil connected to commutator-segments and also closed uncommutated coils, since this has been used in an alternating or intermittent current motor to increase the magnetism of the core.

What I claim is—

1. The combination, with a continuous-current circuit, of a meter comprising an indicating mechanism, an electrical motor for driving it, the armature of said motor having a working coil connected to the circuit, and a closed idle coil or conductor serving to put a load on the motor, substantially as described.

2. The combination, with a continuous-current circuit, of a meter comprising an indicating mechanism, an electrical motor for driving it, the armature of said motor having a working coil connected to the circuit, a closed idle coil or conductor serving to put a load on the motor, and a field-magnet coil connected to the same circuit, substantially as described.

3. The combination of a continuous-current circuit, a meter comprising an indicating mechanism, a motor therefor, the field-magnet coil of which is connected to said circuit, an armature having a coil connected to a commutator, commutator-brushes connected to said continuous-current circuit on opposite sides of a resistance, said armature having also a closed idle conductor serving to put a load on the motor, substantially as described.

This specification signed and witnessed this 8th day of October, 1891.

ARTHUR E. KENNELLY.

Witnesses:
CHARLES M. CATLIN,
JOHN F. RANDOLPH.